Figure 1:
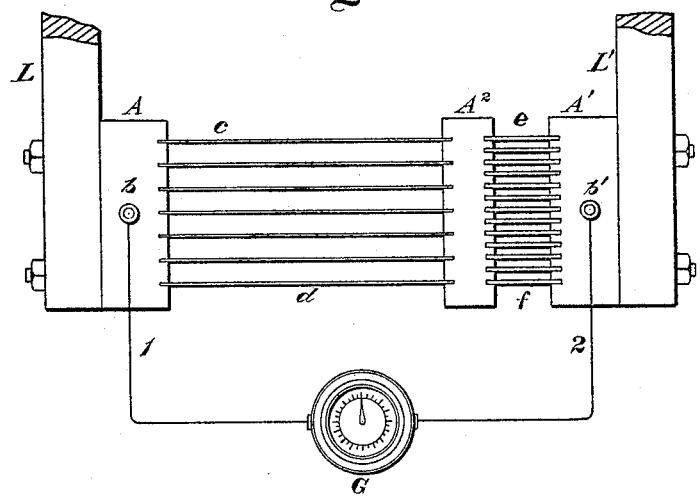

(No Model.)

O. B. SHALLENBERGER, Dec'd.
M. W. SHALLENBERGER, Executrix.
SHUNT FOR ELECTRIC CIRCUITS.

No. 606,171.  Patented June 21, 1898.

WITNESSES:
Ethan D. Dodds
Hubert C. Tener

INVENTOR
Oliver B. Shallenberger
BY Wesley G. Carr
ATTORNEY.

UNITED STATES PATENT OFFICE.

OLIVER B. SHALLENBERGER, OF ROCHESTER, PENNSYLVANIA; MARY W. SHALLENBERGER EXECUTRIX OF SAID OLIVER B. SHALLENBERGER, DECEASED.

SHUNT FOR ELECTRIC CIRCUITS.

SPECIFICATION forming part of Letters Patent No. 606,171, dated June 21, 1898.

Application filed April 22, 1897. Serial No. 633,361. (No model.)

*To all whom it may concern:*

Be it known that I, OLIVER B. SHALLENBERGER, a citizen of the United States, residing at Rochester, in the county of Beaver and State of Pennsylvania, have invented a new and useful Improvement in Shunts for Electric Currents, of which the following is a specification.

My invention relates to electrical apparatus, and more particularly to the measurement, control, and regulation of electric currents by means of apparatus requiring shunting devices for maintaining a definite relation between the currents in two or more branches of an electric circuit.

The object of my invention is to provide a shunt which shall maintain a practically-fixed proportion between the currents in the said branches, notwithstanding considerable variations in the temperature of the surrounding air.

My invention is particularly applicable for use in connection with measuring instruments in which only a portion of the current to be measured is caused to pass through the coils of the instrument proper, the remaining current being carried by a suitably-proportioned shunt to the instrument. It is desirable in such an arrangement to reduce the effect of changes of temperature of the air on the indications of the instrument to the smallest possible amount; and my invention accomplishes this object by the use of a shunt whose temperature coefficient is equal to that of the instrument and without the necessity of making a special alloy or composition having the temperature coefficient required.

If the temperature coefficient of the shunt differs materially from that of the measuring instrument in connection with which it is used, the indications can only be correct at the particular temperature for which the instrument is adjusted. If, for instance, an alloy is used for the shunt which has a negligible temperature coefficient, the indications of the measuring instrument will vary from perfect accuracy by an amount dependent upon the temperature coefficient of the instrument itself. If, on the other hand, the instrument be constructed so as to have a small temperature coefficient, it will nevertheless give inaccurate readings if connected to a shunt having a high temperature coefficient—such, for instance, as copper. It is, in fact, only when the shunt and the measuring instrument or other apparatus to which the shunt is connected, including the connecting-wires, have equal temperature coefficients that the division of the current remains always in the same proportion and when, consequently, the mechanical or other effects of the shunted current can remain proportional to the total current independently of the temperature. In order to maintain this fixed relation of resistances, I construct a shunt of two or more conductors joined either in series or parallel, one of said conductors or groups of conductors having a temperature coefficient greater and the other having a temperature coefficient less than that of the apparatus to be shunted, the resistances of the two or more parts being so proportioned that their combined temperature coefficient, which is necessarily intermediate the two, shall be equal to that of the shunted apparatus.

My invention will be more readily understood by reference to the accompanying drawings, in which—

Figure 2:
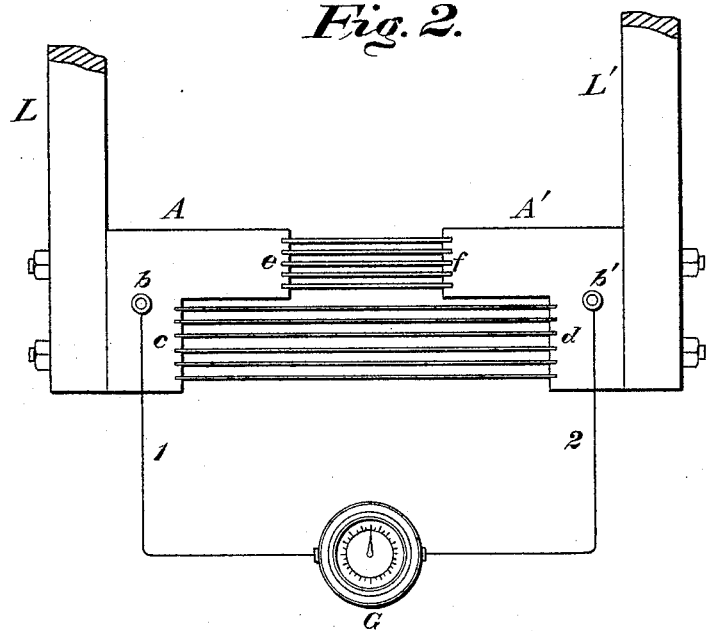

Figure 1 represents a shunt in which two groups of conductors are employed, the groups being connected in series with each other. Fig. 2 shows a form of shunt in which all of the conductors are connected in parallel. In each of these figures the shunt is illustrated as applied to a measuring instrument and will be so described; but it may be used for any other purpose requiring a definite temperature coefficient.

The same letters and figures refer to similar parts in each drawing.

Referring to Fig. 1, A and A' are two massive blocks of copper or other highly-conducting metal connected in the line L L', which carries the current to be measured. $c\,d$ is a group of conductors connected in parallel and made of copper or other metal having a temperature coefficient greater than that of the instrument G, the said conductors being connected at one end to the block A and at the other to the intermediate block $A^2$. $e\,f$ is a similar group of conductors connected in parallel and made of an alloy, such as German silver or other composition, having a temperature coefficient less than that of the instrument G. The resistance of the group $e\,f$ is so proportioned relatively to that of the group $c\,d$ as to cause the resulting temperature coefficient of the entire shunt to be equal to that of the instrument G. The conductors of which the sections or groups of the shunt are composed are preferably made in the form of thin strips or ribbons, so as to provide a large radiating-surface and thus avoid any considerable rise of temperature from the heating effect of the current. The measuring instrument G is connected to the blocks A and A' by means of the binding-posts $b\,b'$ through the conductors 1 2. The total resistance of the shunt may be made of any amount necessary to suit the requirements of the instrument G and the current to be measured so long as the proper proportion between the resistances of the two sections is maintained. By varying the proportions the temperature coefficient of the combination can be made to have any value intermediate the temperature coefficients of the conductors employed in the respective groups.

In Fig. 2 the conducting-blocks A A' are shown of such form as to provide two spaces between them of different lengths for the groups of conductors $c\,d$ and $e\,f$. The group $e\,f$ has a smaller temperature coefficient and the group $c\,d$ has a greater temperature coefficient than that of the instrument G. In this arrangement the current is divided in parallel among all the conductors of the shunt, and these conductors are so proportioned in number, form, and specific resistance as to obtain the resistance and temperature coefficient required. The temperature coefficient may be varied by changing the proportions, so that any value may be obtained intermediate those of the two conducting materials used, as in the series arrangement, and the proper relations are determined according to well established principles governing the division of currents between conductors connected in parallel. The same precautions must be observed in this arrangement as in Fig. 1 for the radiation of heat generated by the passage of the current, so that the rise of temperature above the air may not exceed a certain negligible or assigned limit. The particular forms and proportions shown in the drawings are simply illustrative, and it will be understood that the conformation of the blocks A, A', and $A^2$ and the relative lengths and number of the conducting-strips must be varied to conform to the desired effect and to the specific resistances and temperature coefficients of the conductors used. When, as is usually the case, the total resistance of the shunt is only a small fraction of an ohm, the terminal blocks A, A', and $A^2$ are preferably made of large cross-section relatively to the resistance-strips $c\,d$ and $e\,f$, so that the resistance of these blocks, and consequently their effect on the temperature coefficient of the combination, is negligible. If, however, the conductors take the form of coils of considerable resistance adapted for small currents, the terminal blocks may be small or practically omitted. In the series arrangement shown in Fig. 1 the intermediate block $A^2$ may be omitted in some cases where the relative numbers of strips in the two sections $c\,d$ and $e\,f$ and other conditions are such as to admit of joining them directly by soldering, brazing, or other means adapted to the current and resistances employed. The sections or groups of conductors $e\,f$ described as having the smaller temperature coefficient are shown in the drawings of shorter length than the groups $c\,d$, for the reason that, in general, conductors having small temperature coefficients are of high specific resistance, so that only a moderate length of conductor is required in ordinary cases.

While the two forms of apparatus shown in Figs. 1 and 2 have substantially the same effect in practice, there is theoretically a slight difference in their operation. The series arrangement has a temperature coefficient which is as nearly constant at all temperatures as those of the metals employed, whereas in the parallel arrangement it may vary slightly from absolute constancy for a wide range of temperature; but this effect is for all ordinary purposes quite negligible, being no greater than the slight inaccuracies usually incident to this class of measurement—such, for instance, as the errors from small differences in temperature between the instrument and the shunt.

I claim as my invention—

1. An electric shunt comprising two groups of conductors which have different temperature coefficients, substantially as described.

2. A shunt having a resistance varying with changes of temperature, and a second resistance connected therewith for the purpose of modifying such variations in resistance, each of said resistances comprising a group of conductors arranged in multiple, substantially as described.

3. A composite shunt having a plurality of multiple resistances differently affected by changes in the temperature of the surrounding air, said resistances being connected to act conjointly in modifying the effect of said changes in temperature, substantially as described.

4. In a shunt for electrical apparatus, a combination of multiple resistances in which a plurality of conducting materials is employed, said materials having different degrees of variation in resistance for a given change in the temperature of the surrounding air, substantially as and for the purpose described.

5. In a shunt for electrical apparatus designed to have a certain definite variation in resistance for a given change in the temperature of the surrounding air, the combination of a group of conductors having a greater variation, and a second group of conductors having a less variation than the said definite variation required.

6. In a shunt for electrical apparatus, the combination of a multiple resistance which varies with changes in the temperature of the surrounding air, and a second multiple resistance having a comparatively small variation for like changes in temperature, substantially as described.

7. The combination with an electrical device comprising a circuit having a resistance varying with changes in the temperature of the surrounding air, of a shunt thereto comprising conductors composed of materials having different temperature coefficients, said conductors being so proportioned that their joint resistance shall vary with changes in the temperature of the air so as to maintain a practically fixed ratio between the resistances of said shunt and said circuit.

8. The combination with an electrical measuring instrument in which the indications for a given difference of potential are rendered inaccurate by changes in the temperature of the surrounding air, of a shunt thereto comprising two conductors having temperature coefficients differing from each other and adjusted to jointly vary the resistance of said shunt with changes in the temperature of the air so as to compensate for the variations of said measuring instrument.

In testimony whereof I have hereunto subscribed my name this 14th day of April, 1897.

OLIVER B. SHALLENBERGER.

Witnesses:
   WM. F. FISHER,
   GEO. R. BUCKMAN.